United States Patent [19]

Kurakake et al.

[11] Patent Number: 4,477,762

[45] Date of Patent: Oct. 16, 1984

[54] SERVOMOTOR CONTROL METHOD AND APPARATUS THEREFOR

[75] Inventors: Mitsuo Kurakake, Hino; Keiji Sakamoto, Hachioji, both of Japan

[73] Assignee: Fujitsu Limited, Kawasaki, Japan

[21] Appl. No.: 535,341

[22] Filed: Sep. 23, 1983

[30] Foreign Application Priority Data

Sep. 24, 1982 [JP] Japan ................................ 57-166367

[51] Int. Cl.³ ............................................. H02P 5/40
[52] U.S. Cl. .................................... 318/802; 318/811; 318/806
[58] Field of Search .............................. 318/807–811, 318/802, 798, 806

[56] References Cited

U.S. PATENT DOCUMENTS 4,259,628 3/1981 Iwakane et al. ..................... 318/808
4,310,791 1/1982 Akamatsu ........................... 318/812
4,361,794 11/1982 Kawada et al. ..................... 318/811

Primary Examiner—David Smith, Jr.
Attorney, Agent, or Firm—Staas & Halsey

[57] ABSTRACT

In servo-controlling a servomotor by a rotational velocity feedback loop and current feedback loop, a compensatory rotational velocity signal is produced to render the current feedback loop independent of the actual rotational velocity of the servomotor. To this end, the actual rotational velocity of the servomotor is amplified by a predetermined multiplication factor, and the resulting amplified signal is applied to a pulse width modulation signal obtained on the basis of a current difference between the actual current of the servomotor and a commanded current, which is based on a commanded velocity. The modulation signal resulting from the application of the amplified signal is applied to a current drive circuit of the servomotor.

6 Claims, 10 Drawing Figures

SERVOMOTOR CONTROL METHOD AND APPARATUS THEREFOR

BACKGROUND OF THE INVENTION

This invention relates to a method and apparatus for servomotor control, wherein the current response characteristic of a servomotor, particularly a synchronous motor, is improved.

Servomotors find wide use in a variety of fields, and in recent years A.C. servomotors have been developed. One example of an A.C motor used as a servomotor is a synchronous motor. Synchronous motors employing a permanent magnet as a rotor are coming into ever wider use since they are brushless, noiseless and simple in construction.

Synchronous motors of this type must be so controlled as to render torque constant. To this end, a technique for controlling the motor has been developed wherein a current of the same phase as the electromotive force induced by the rotor is caused to flow into the armature winding, which serves as the stator. This technique will now be described with reference to FIG. 1, which shows the construction of a synchronous motor. The magnetic flux density B at a position displaced by $\theta$ degrees from the q axis of the magnetic field generated by a rotor 1, namely a permanent magnet, is given by the following:

$$B = B_m \sin\theta \tag{1}$$

The magnetic flux $\phi$ interlinked with the a winding of a stator 2 shown in FIG. 1 is expressed as follows:

$$\phi = -\phi_m \cos\theta_c \tag{2}$$

where $\phi_m$ represents the magnetic flux on the q axis of the rotor 1. Accordingly, the electromotive force $e_1$ induced in the a winding is expressed as follows:

$$e_1 = -d\phi/dt \tag{3}$$
$$= -\phi_m \cdot p \cdot \omega_m \cdot \sin\theta$$

where $\theta = P\theta_m = P \cdot \omega_m \cdot t$.

Likewise, the electromotive forces $e_2$, $e_3$ induced in the b and c windings of the stator 2, which are disposed at angles of $\frac{2}{3}\pi$ and $\frac{4}{3}\pi$ relative to the a winding, respectively, are expressed by the following:

$$e_2 = -\phi_m \cdot P \cdot \omega_m \cdot \sin(\theta - \tfrac{2}{3}\pi) \tag{4}$$

$$e_3 = -\phi_m \cdot P \cdot \omega_m \sin(\theta - 4/3\pi) \tag{5}$$

If we let the currents flowing in the armature windings a, b, c be represented by $i_1$, $i_2$, $i_3$, respectively, then the output torque T of such a three-phase synchronous motor will be expressed by the following:

$$T = \tfrac{1}{2}(e_1 \cdot i_1 + e_2 \cdot i_2 + e_3 \cdot i_3) \tag{6}$$

Therefore, substituting Eqs. (3), (4) and (5) into Eq. (6), we have:

$$T = -\tfrac{1}{2}\phi_m P \cdot \omega_m \left( i_1 \cdot \sin\theta + i_2 \cdot \sin\left(\theta - \tfrac{2}{3}\pi\right) + i_3 \cdot \sin\left(\theta - \tfrac{4}{3}\pi\right) \right) \tag{7}$$

To render the torque T constant, T should be independent of the angle Q. Therefore, if the following relations hold, namely:

$$i_1 = I\sin\theta \tag{8}$$
$$i_2 = I\sin\left(\theta - \tfrac{2}{3}\pi\right)$$
$$i_3 = I\sin\left(\theta - \tfrac{4}{3}\pi\right)$$

where I is the current amplitude, then T may be written as follows, from Eq. (7):

$$T = \tfrac{1}{2} K \left\{ I\sin^2\theta + I\sin^2\left(\theta - \tfrac{2}{3}\pi\right) + I\sin^2\left(\theta - \tfrac{4}{3}\pi\right) \right\} \tag{9}$$
$$= \tfrac{3}{2} KI$$

Thus, the torque T is constant, being independent of the rotational orientation of the rotor 1.

To carry out such control, it is necessary to detect the rotor angle of the synchronous motor and regulate each of the armature current values in accordance therewith.

However, if the current flowing through each armature winding happens to be delayed by $\phi_o$ from the ideal value, then the currents $i_1$, $i_2$, $i_3$ of the respective armature windings will take on the form:

$$i_1 = I\sin(\theta - \phi_o)$$
$$i_2 = I\sin(\theta - \tfrac{2}{3}\pi - \phi_o)$$

$$i_1 = I\sin(\theta - \phi_o)$$
$$i_2 = I\sin\left(\theta - \tfrac{2}{3}\pi - \phi_o\right)$$
$$i_3 = I\sin\left(\theta - \tfrac{4}{3}\pi - \phi_o\right)$$

In consequence, the output torque T will take on the form:

$$T = \tfrac{3}{2} KI \sin\left(\tfrac{\pi}{2} + \phi_o\right)$$

from which it will be understood that the torque decreases in value.

Thus, in order to render the torque of a synchronous motor constant, it is necessary to improve the actual current response for each current command. Specifically, as shown in the block diagram of FIG. 2 illustrating a synchronous motor control circuit according to the prior art, the actual rotational velocity v of a synchronous motor 101 is detected, the difference between v and a commanded velocity VCMD is found by an arithmetic unit 105, the velocity difference obtained is converted into a current command I by a velocity loop operational circuit 106, thereafter the difference between the current command I and the actual current i flowing into the synchronous motor 101 is computed by an arithmetic unit 110, the current difference is operated upon by a current loop operational circuit 113, and the output of the operational circuit 113 is power amplified by a pulse width modulator/inverter circuit 115, with the output of the circuit 115 being applied to the synchronous motor 101. The effect of this arrangement is to improve the frequency characteristic of the current loop and provide a more satisfactory actual current response with respect to the current command. If the synchronous motor 101 is expressed in terms of a transfer function, as shown in FIG. 2, the current loop includes feedback from the velocity v, which is attributed to the back electromotive force constant Ke of the motor. In FIG. 2, TR represents load torque, and La, Ra, Kt, J denote transfer constants. This velocity feedback has an effect upon the actual current. At high velocity, the current loop is influenced by the velocity v, resulting in a less than satisfactory actual current response.

More specifically, let us consider motor acceleration, with reference being had to FIG. 3. In a situation where the velocity feedback is negligible, velocity v and actual current i make ideal transitions at each point in time t, as indicated by the dashed lines. Owing to velocity feedback, however, the actual current i is influenced by the velocity v, as shown by the solid line in FIG. 3(b). The disadvantageous results are an enlarged current magnitude and prolonged acceleration time.

SUMMARY OF THE INVENTION

Accordingly, an object of the present invention is to provide a servomotor control circuit wherein the effect of velocity feedback in a current loop is negligible, thereby allowing the current response characteristic to be improved.

According to the present invention, the foregoing object is attained by providing a servomotor control system wherein a servomotor is servo-controlled by a rotational velocity feedback loop and current feedback loop, with a compensatory velocity feedback loop being provided for rendering the current feedback loop independent of the rotational velocity of the servomotor.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
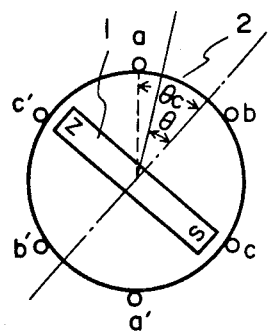
FIG. 1 is a schematic diagram of the construction of a synchronous motor.
Figure 3:
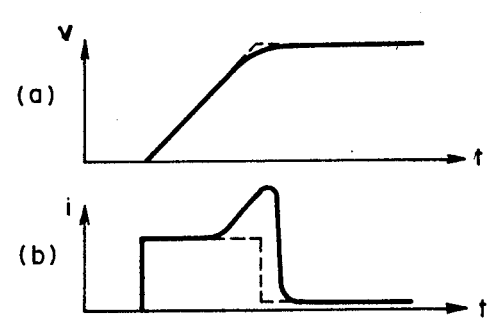
FIGS. 3(a) and 3(b) are graphs of velocity and current characteristics, respectively, obtained with the control apparatus of the prior art.
Figure 2:
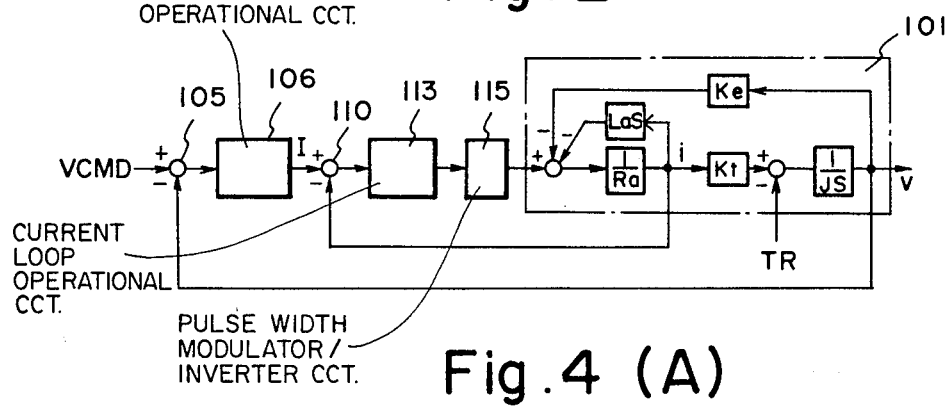
FIG. 2 is a block diagram of a servo control apparatus according to the prior art.

In connection with FIG. 2, a differential equation involving actual velocity v and actual current i, in which load torque is negligible, may be written as follows:

$$\frac{d}{dt}\begin{pmatrix} v \\ i \end{pmatrix} = \begin{pmatrix} 0 & \frac{Kt}{J} \\ -\frac{Ke}{La} & -\frac{Ra}{La} \end{pmatrix} \times \begin{pmatrix} v \\ i \end{pmatrix} + \begin{pmatrix} 0 \\ \frac{1}{La} \end{pmatrix} e \quad (10)$$

The foregoing can be explained in terms of a discrete value system where control is effected by means of a microcomputer. Specifically, rewriting Eq. (10) in a discrete value system at a sampling period T will give us the following:

$$v(k+1) = \phi_{11} \cdot v(k) + \phi_{12} \cdot i(k) + h_1 \cdot u(k) \quad (11)$$

$$i(k+1) = \phi_{21} \cdot v(k) + \phi_{22} \cdot i(k) + h_2 \cdot u(k) \quad (12)$$

where u(k) represents the output of the current loop operational circuit 113. It will be appreciated from Eq. (12) that eliminating the velocity term v(k) will render the current i(k+1) independent of velocity.

Therefore, according to the present invention, a servomotor control apparatus is provided with a velocity feedback loop, and the apparatus is arranged to cancel a deterioration in the current response characteristic, which is caused by the inherent velocity feedback of the synchronous motor.

Figure 4:
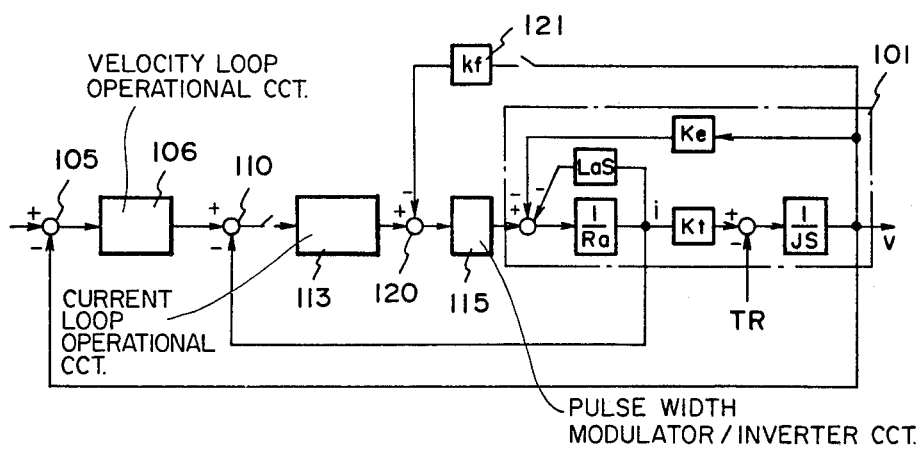
FIG. 4(A) is a block diagram of a servomotor control apparatus according to the present invention.
FIG. 4(B) is a flowchart of steps illustrating a servomotor control method according to the present invention.

FIG. 4(A) is a block diagram illustrating an embodiment of the present invention. Portions similar to those shown in FIG. 2 are designated by like reference characters. Numeral 120 denotes an adder, and 121 a multiplier, these elements constituting a velocity feedback loop. If we assume that the multiplier 121 has a transfer constant kf and that this velocity feedback is applied to Eq. (12), then Eq. (12) may be written:

$$i(k+1) = (\phi_{21} - kf \cdot h_2)v(k) + \phi_{22} \cdot i(k) + h_2 \cdot u(k) \quad (13)$$

Therefore, if a selection is made such that:

$$\phi_{21} - kf \cdot h_2 = 0$$

$$\therefore kf = \phi_{21}/h_2 \quad (14)$$

then Eq. (13) will reduce to:

$$i(k+1) = \phi_{22} i(k) + h_2 u(k) \quad (15)$$

so that the actual current i(k+1) will be independent of the velocity v.

Accordingly, since the characteristic of the current loop can be controlled independently of the velocity of the synchronous motor, there will be no deterioration in the response of the current loop even at high speeds.

Figure 4B:
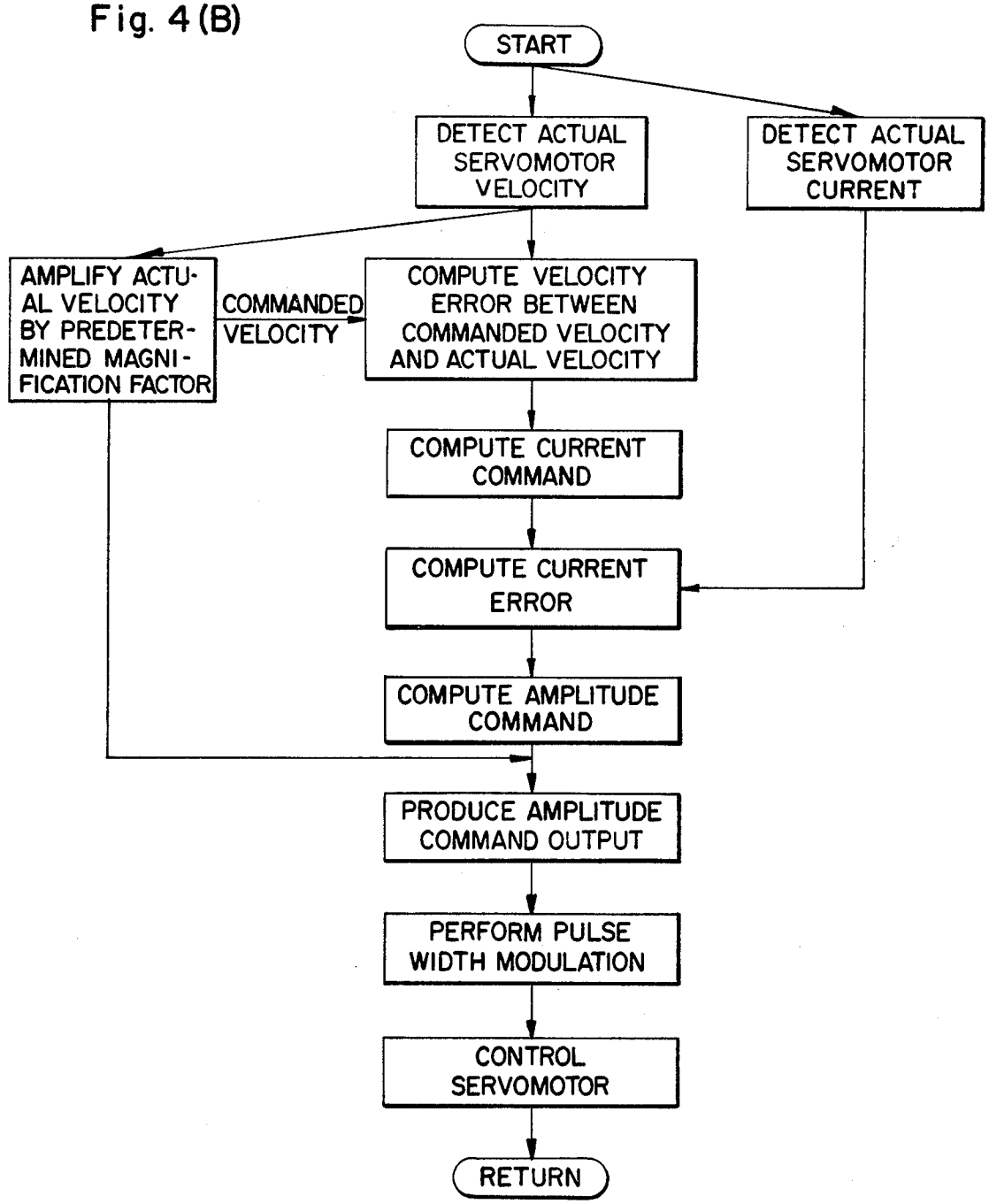

FIG. 4(B) is a flowchart illustrating the steps for controlling a servomotor according to the present invention. The first step is to turn on the power supply to introduce three-phase power to the servomotor, thereby driving the motor into rotation. This is followed by detecting the actual rotational velocity of the servomotor and the actual current flowing in the servomotor. When a commanded velocity is applied for the purpose of controlling motor velocity, a velocity error is obtained by computing the difference between the two, and the velocity error is amplified to produce an armature current amplitude command. Next, a current command is computed based on the amplitude command. The next step is to obtain a current error by computing the difference between the current command and the actual current flowing in the servomotor. A pulse modulation signal is then obtained on the basis of the current error. Further, a signal obtained by amplifying the actual rotational velocity of the servomotor by a predetermined multiplying factor, namely a velocity compensation signal which compensates for the effect of actual rotational velocity feedback on the actual current of the servomotor, is applied to the pulse width modulation signal, and the power transistors comprising an inverter circuit are turned on and off on the basis of the resulting modulation signal, thereby to control the servomotor.

Figure 5:
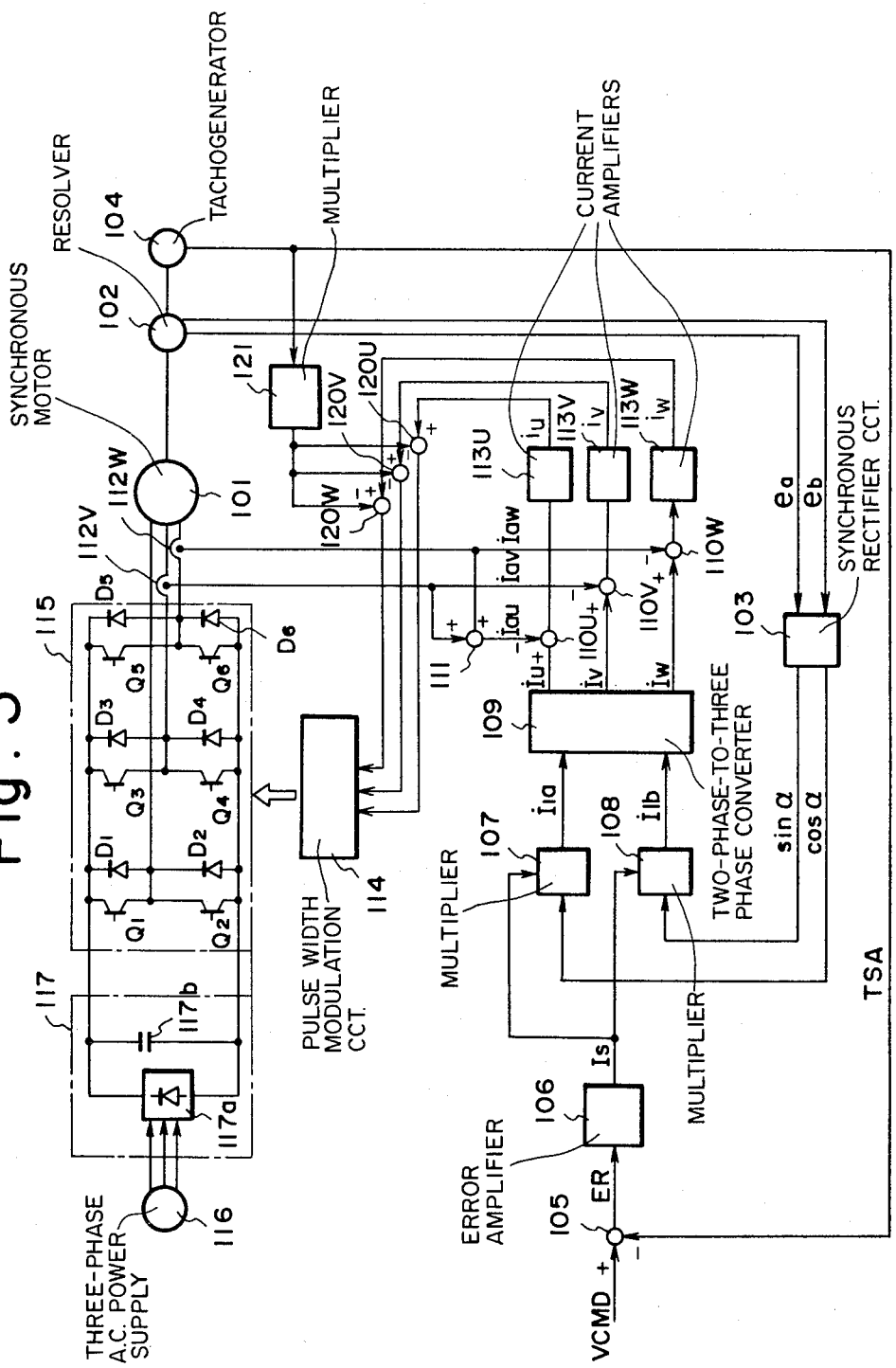
FIG. 5 is a circuit diagram of an embodiment of the present invention.

FIG. 5 is an analog circuit diagram of an embodiment of the present invention. A synchronous motor 101 with a revolving magnetic field has an output shaft to which a resolver 102 is coupled for detecting the position of the field poles of the motor. The resolver 102 produces a sine wave voltage $e_a$ and a cosine wave voltage $e_b$ dependent upon the angular position $\theta$ of the field poles of the synchronous motor 101. A synchronous rectifier circuit 103 synchronously rectifies the sine wave voltage $e_a$ and the cosine wave voltage $e_b$ to produce $\sin\alpha$ and $\cos\alpha$. A tachogenerator 104 outputs an actual velocity voltage TSA proportional to the rotational velocity of the synchronous motor 101. Designated at 105 is an arithmetic circuit for determining the difference ER (hereinafter referred to as a "velocity error") between a velocity command voltage VCMD issued by a velocity command circuit (not shown) and the actual velocity voltage TSA. Numeral 106 denotes an error amplifier for amplifying the velocity error ER to produce an amplitude $I_s$ of an armature current. Multipliers 107, 108 multiply the output of the error amplifier 106 by the outputs $\cos\alpha$, $\sin\alpha$ from the synchronous rectifier circuit 103 to produce two-phase current commands $I_{1a}(=I_s\cdot\sin\alpha)$, $I_{1b}(=I_s\cdot\cos\alpha)$. Numeral 109 denotes a two phase-to-three phase converter for producing the following outputs:

$$\left.\begin{aligned} i_u &= i_{1a} \\ i_v &= -\tfrac{1}{2} i_{1a} + \sqrt{\tfrac{3}{2}} i_{1b} \\ i_w &= -\tfrac{1}{2} i_{1a} - \sqrt{\tfrac{3}{2}} i_{1b} \end{aligned}\right\} \quad \ldots (16)$$

The outputs $\dot{I}_u$, $\dot{I}_v$, $\dot{I}_w$ are $2\pi/3$ out of phase with each other, and constitute three-phase current commands in phase with the induced voltage $E_o$. Indicated at 110U, 110V, 110W are arithmetic circuits in the respective phases for computing the differences between the command currents $\dot{I}_u$, $\dot{I}_v$, $\dot{I}_w$ and actual phase currents $\dot{I}_{au}$, $\dot{I}_{av}$, $\dot{I}_{aw}$, respectively. Numerals 112V, 112W designate current transformers for sensing the actual phase currents $\dot{I}_{av}$, $\dot{I}_{aw}$ in the respective V and W phases, and 113U, 113V, 113W represent current amplifiers in the respective phases for amplifying the current differences input thereto from the arithmetic circuits 110U, 110V, 110W to produce outputs $i_u$, $i_v$, $i_w$ in the respective phases U, V, W. Numeral 114 denotes a pulse width modulation circuit, and 115 an inverter circuit controlled by the output of the pulse-width modulation circuit. A three-phase A.C. power supply 116 supplies power to a well-known rectifier circuit 117 comprising a group of diodes 117a and a capacitor 117b for converting the three-phase alternating current into direct current.

Figure 6:
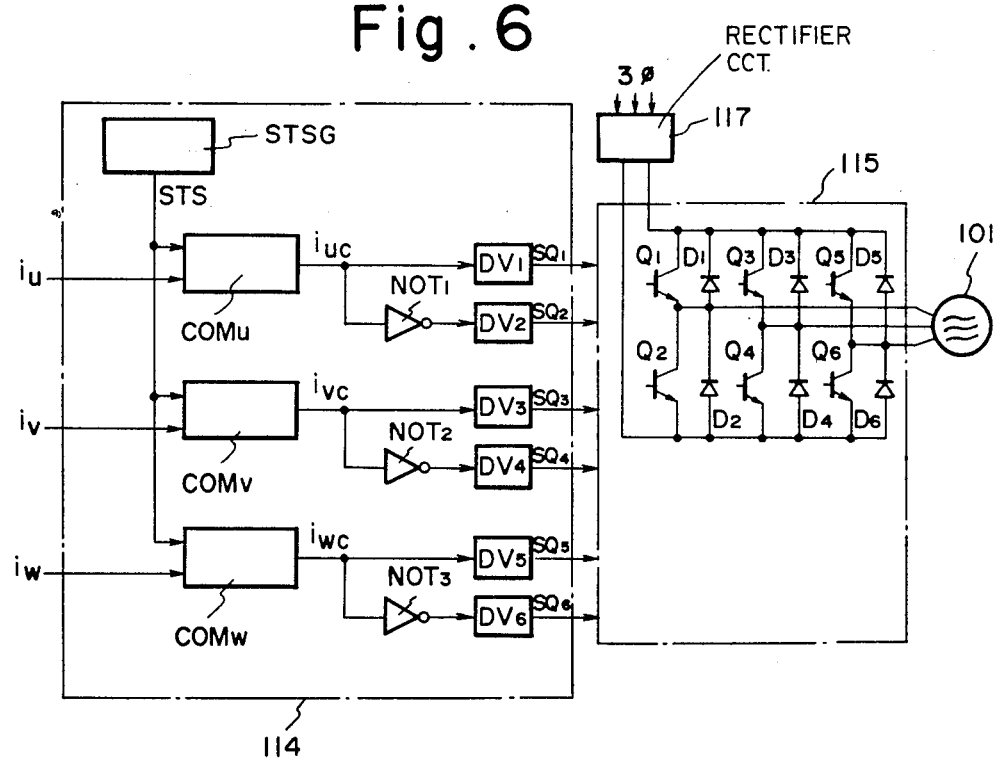
FIG. 6 is a block diagram showing, in some detail, the construction of a pulse width modulator circuit and and inverter circuit included in the circuit of FIG. 5.
Figure 7:
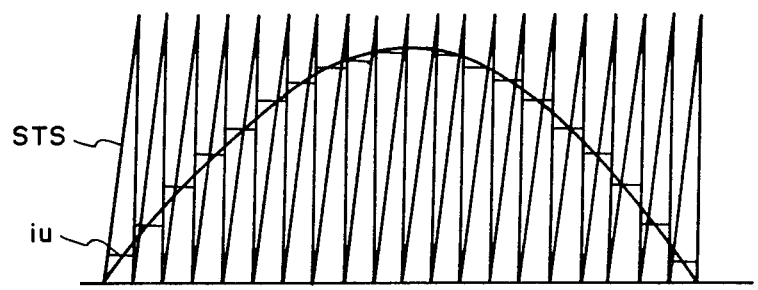
FIG. 7 is a waveform diagram for describing the operation of the circuitry shown in FIG. 6.
Figure 7:

As illustrated in FIG. 6, the pulse width modulation circuit 114 comprises a sawtooth generating circuit STSG for generating a sawtooth waveform STS, comparators $COM_U$, $COM_V$, $COM_W$, NOT gates $NOT_1$ through $NOT_3$, and drivers $DV_1$ through $DV_6$. The inverter 115 includes six power transistors $Q_1$ through $Q_6$ and six diodes $D_1$ through $D_6$. The comparators $COM_U$, $COM_V$, $COM_W$ of the pulse width modulation circuit 114 compare the sawtooth signal STS with the amplitudes of the three-phase alternating current signals $\dot{I}_u$, $\dot{I}_v$, $\dot{I}_w$, respectively, and produce a "1" output when the magnitude of the sawtooth waveform STS is exceeded by $\dot{I}_u$, $\dot{I}_v$ or $\dot{I}_w$, or a "0" output when the magnitude of the sawtooth waveform STS is greater. Thus, with respect to $i_u$, the comparator $COM_U$ produces the current command $i_{uc}$ shown in FIG. 7. More specifically, pulse-width modulated three-phase current commands $i_{uc}$, $i_{vc}$, $i_{wc}$ dependent upon the amplitudes of $i_u$, $i_v$, $i_w$ are delivered as inverter drive signals $SQ_1$ through $SQ_6$ via NOT gates $NOT_1$ through $NOT_3$ and drivers $DV_1$ through $DV_6$, and are applied as input signals to the inverter 115. The inverter drive signals $SQ_1$ through $SQ_6$ input to the inverter 115 are applied to the bases of the power transistors $Q_1$ through $Q_6$, respectively, thereby controlling the on/off action of the power transistors to supply the synchronous motor 101 with a three-phase current.

Returning to FIG. 5, numeral 121 denotes a multiplier for multiplying the velocity TSA by the constant kf to produce a velocity compensation signal, which is applied to adders 120U, 120V, 120W. These in effect subtract the velocity compensation signal, which is produced by the multiplier 121, from the current output signals $i_u$, $i_v$, $i_w$ produced by the respective current amplifiers 113U, 113V, 113W. The multiplier 121 and adders 12U, 120V, 120W constitute a velocity feedback loop.

Let us now discuss the operation of the apparatus shown in FIG. 5 in a case where the velocity command is elevated while the synchronous motor 101 is rotating at a certain velocity.

To rotate the motor 101 at a desired velocity $V_c$, an addition terminal of the arithmetic circuit 105 is supplied with a velocity command voltage VCMD of a predetermined analog value. Since the synchronous motor 101 is rotating at an actual velocity $V_a(<V_c)$, the tachogenerator 104 produces the actual velocity voltage TSA proportional to the actual motor velocity $V_a$, the actual velocity voltage TSA being applied to a subtraction terminal of the arithmetic circuit 105. The latter computes a velocity error ER, which is the difference between the commanded velocity $V_c$ and the actual velocity $V_a$, and applies the velocity error ER to the error amplifier 106. The latter performs a proportional integration operation expressed by the following equation:

$$I_s = K_1(V_c - V_a) + K_2\Sigma(V_c - V_a) \brace \Sigma(V_c - V_a) = \Sigma(V_c - V_a) + (V_c - V_a) \quad \ldots (17)$$

The result $I_s$ in Eq. (17) corresponds to the amplitude of the armature current. Specifically, when the load varies or the velocity command changes, the velocity error ER $(=V_c-V_a)$ becomes greater, as does the current command amplitude $I_s$ correspondingly. The increased amplitude $I_s$ results in the production of a greater torque, which brings the actual rotational velocity of the motor into conformity with the commanded velocity.

Meanwhile, the two-phase signals $\sin\alpha$, $\cos\alpha$, which indicate the position (angle $\alpha$) of the field poles of the synchronous motor 101, are produced by the resolver 102 and synchronous rectifier circuit 103.

Next, the two phase-to-three phase conversion circuit 109 performs the operation of Eq. (16) to produce the three-phase current commands $I_u$, $I_v$, $I_w$. These are three-phase current commands similar in phase to the induction voltage $E_o$ of the synchronous motor 101.

The arithmetic circuits 110U, 110V, 110W subsequently compute the differences between the three-phase command currents $I_u$, $I_v$, $I_w$ and the actual phase currents $I_{au}$, $I_{av}$, $I_{aw}$. Three-phase A.C. signals $i_u$, $i_v$, $i_w$ indicative of the computed differences are amplified by the current 113U, 113V, 113W and applied to the pulse width modulation circuit 114.

As described above, the pulse width modulation circuit 114 compares the amplitudes of the three-phase A.C. signals $i_u$, $i_v$, $i_w$ with the amplitude of the sawtooth signal STS, and applies pulse-width modulated three-phase current commands to the bases of the power transistors $Q_1$ through $Q_6$ constituting the inverter 115, thereby controlling the on-off action of these power transistors to supply the synchronous motor 101 with three-phase currents. The motor 101 continues to be controlled in a similar manner until the motor speed finally comes into agreement with the commanded speed.

The multiplier 121 amplifies the actual velocity TSA by kf and applies the resulting velocity compensation signal to the adders 120U, 120V, 120W, which substract the compensation signal from the outputs of the current amplifiers 113U, 113V, 113W, respectively. In other words, the outputs of the current amplifers are applied to the pulse width modulation circuit 114 after being diminished by an amount equivalent to the velocity compensation signal. In consequence, the actual current that flows into the synchronous motor is absolutely free of the influence of velocity.

Figure 8:
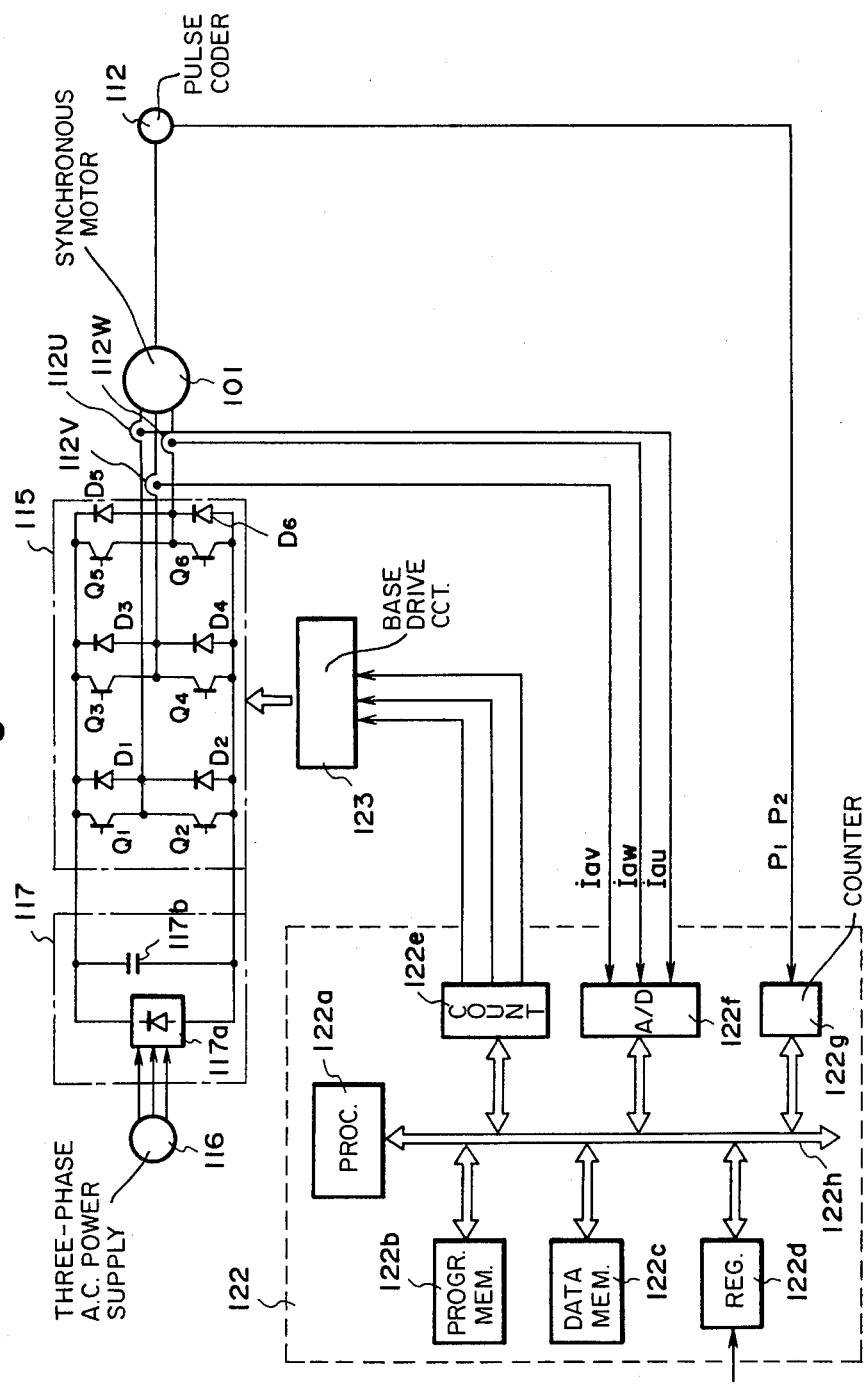
FIG. 8 is a circuit diagram of another embodiment of the present invention.

FIG. 8 is a circuit diagram of another embodiment of the present invention, in which the servomotor control apparatus is realized through microcomputer techniques. Portions similar to those shown in FIG. 5 are designated by like reference characters. Numeral 122 denotes an operation control unit programmed to execute processing for performing the functions of the arithmetic circuit 105, error amplifier 106, multiplier circuits 107, 108, two phase-to-three phase conversion circuit 109, arithmetic circuits 110U, 110V, 110W, current amplifiers 113U, 113V, 113W, multiplier circuit 121 and adders 120U, 120V, 120W. The operation control unit comprises a processor 122a for executing processing in accordance with a motor control program; a program memory 122b for storing the motor control program; a data memory 122c for storing data; a register 122d that receives a digital command from an external unit such as a numerical control unit; a counter 122e for applying a pulse width modulation signal to a base drive circuit 123; an analog-to-digital (AD) converter 122f for converting, into digital values, the actual phase currents $I_{au}$, $I_{av}$, $I_{aw}$ received from the current transformers 112U, 112V, 112W; a counter 122g in which a position code from the pulse coder 112, indicating the rotational position $\alpha$ of the field poles of synchronous motor 101, is initially loaded, and which thereafter counts rotation pulses P1, P2 generated by the pulse coder 112 each time the synchronous motor 101 rotates through a predetermined angle; and an address/data bus 122h interconnecting the aforementioned units 122a through 122g.

The operation of the apparatus shown in FIG. 8 will now be described.

We will assume a situation similar to that described above in connection with FIG. 5, where the velocity command is elevated while the synchronous motor 101 is rotating at a certain velocity. A position code is loaded in the counter 122g immediately before the synchronous motor 101 begins rotating, and the pulse coder 112 generates the pulses P1, P2 as the motor 101 rotates. Accordingly, the state of counter 122g is a constant indication of the rotational position of the motor field poles. Since the frequency at which the pulses P1, P2 are generated is proportional to the rotational velocity of the motor 101, the amount by which the counter 122g is incremented in a predetermined interval will correspond to the rotational velocity.

A velocity command VCMD for rotating the synchronous motor 101 at a desired velocity $V_c$ is applied to the register 122d from an external unit, such as a numerical control unit, and is transmitted to the processor 122a through the bus 122h. The processor 122a then reads the state of counter 122g via the bus 122h, computes the difference between this value and the previously read value, and divides the difference by a sampling interval T to compute the actual velocity $V_a$. The processor 122a also computes the velocity error ER, which is the difference between the velocity command VCMD and the actual velocity $V_a$, and performs the operation of Eq. (17), namely the operation performed by the error amplifier 106 in FIG. 5, to produce an amplitude command $I_s$. The foregoing operations correspond to velocity loop processing steps.

Next, using the value of the count in counter 122g, the processor 122a obtains the digital values of the aforementioned $\sin\alpha$ and $\cos\alpha$ signals. This is accomplished by relying upon a correspondence table, which is stored in the data memory 122c, giving the correspondence between counted values and the digital values of $\sin\alpha$ and $\cos\alpha$. The counted value read out of the counter 122g is used to retrieve the corresponding digital values of $\sin\alpha$, $\cos\alpha$ from the data memory 122c. The processor 122a then multiplies the amplitude command $I_s$ by the retrieved values of $\sin\alpha$ and $\cos\alpha$ to obtain the two-phase current commands $I_{Ia}$, $I_{Ib}$, and performs the operation of Eq. (16), described in connection with FIG. 5, to obtain the three-phase current commands $I_u$, $I_v$, $I_w$. The processor 122a now reads, via the bus 122h, the actual current values obtain by digitizing, through the AD converter 122f, the actual phase currents $I_{au}$, $I_{av}$, $I_{aw}$ obtained from the current transformers 112U, 112V, 112W, computing the difference between the three-phase current commands $I_u$, $I_v$, $I_w$ and the phase currents $I_{av}$, $I_{aw}$, $I_{au}$, respectively, and amplifying the differences by the predetermined amplification factors to obtain the digital values of the three-phase A.C. signals $i_u$, $i_v$, $i_w$. These operations correspond to current loop processing steps.

Next, the processor 122a multiplies the actual velocity Va, obtained by the velocity loop processing steps, by the constant kf to obtain a velocity compensation output VCO, which the processor proceeds to subtract from the digital three-phase A.C. signals $i_u$, $i_v$, $i_w$ to correct these signals. The processor 122a delivers these corrected digital A.C. signals $i_u$, $i_v$, $i_w$ to the counter 122e through the bus 122h, the counter producing a pulse width modulation signal. The pulse modulation operation may be performed in the manner disclosed in Japanese patent application Laid-Open No. 53-48449. Specifically, there are provided an up/down counter circuit and a digital integrated circuit having a clock oscillator for driving the counter circuit. A programmable read-only memory responds to the up/down counter, and a digital output signal proportional to a pulse width modulation signal for the power supply stage is generated. Thus, a D.C. voltage can be digitally converted into an A.C. output voltage directly without using an A.C. reference waveform.

The pulse modulation waveform signal is applied to the base drive circuit 123, so that three-phase current may thereafter be supplied to the inverter 115 in the manner described above in connection with FIG. 5.

The processor 122a executes the foregoing processing at the sampling period T in accordance with the control program stored in the program memory 122b to control the synchronous motor 101, the velocity of which will eventually be brought into conformance with the commanded velocity.

In accordance with the present invention as described and illustrated hereinabove, a servomotor is servo-controlled by a velocity feedback loop and current feedback loop, and a compensatory velocity feedback loop is provided to cancel the velocity dependence characteristic of the current feedback loop, i.e., to make the current feedback loop independent of the servomotor velocity. The effect is to prevent the influence of velocity feedback on the actual current inherent to the servomotor. As a result, there is no deterioration in the current loop response characteristic even when the servomotor speed is high, and neither current magnitude nor acceleration time grow large in size.

As many apparently widely different embodiments of the present invention can be made without departing from the spirit and scope thereof, it is to be understood that the invention is not limited to the specific embodiments thereof except as defined in the appended claims.

What we claim is:

1. A servomotor control method for a system having a current drive circuit for driving the servomotor, comprising the steps of:
   (a) detecting the actual rotational velocity of the servomotor;
   (b) detecting the actual current flowing into the servomotor;
   (c) determining a velocity error based on the difference between a commanded velocity and the actual rotational velocity;
   (d) generating a current command based on the velocity error;
   (e) determining a current error based on the difference between the current command and the actual current;
   (f) amplifying the actual rotational velocity by a predetermined multiplying factor to produce a velocity compensation signal;
   (g) combining the current error and the velocity compensation signal to generate a compensated amplitude command signal; and
   (h) controlling the operation of the current drive circuit based on the compensated amplitude command signal.

2. A servomotor control apparatus operatively connected to receive a velocity command signal and having means for driving the servomotor, comprising:
   first means, operatively connected to the servomotor and operatively connected to receive the velocity command signal, for generating a current error based on the velocity command signal, the actual rotational velocity of the servomotor, and the actual current flowing into the servomotor;
   second means, operatively connected to the servomotor, for amplifying the actual rotational velocity by a predetermined multiplying factor to produce a velocity compensation signal; and
   third means, operatively connected to said first means, said second means and to the means for driving the servomotor, for combining the current error and the velocity compensation signal to generate a compensated amplitude command signal for actuating the means for driving the servomotor.

3. A servomotor control apparatus as set forth in claim 2, wherein said second means comprises a multiplier and wherein said third means comprises an adder circuit.

4. A servomotor control apparatus operatively connected to receive a velocity command signal and having means for driving the servomotor, comprising:
   first means, operatively connected to the servomotor and operatively connected to receive the velocity command signal, for generating a current command based on the velocity command signal and the actual rotational velocity of the servomotor;
   second means, operatively connected to the servomotor, for detecting the actual current flowing into the servomotor;
   third means, operatively connected to said first means and said second means, for generating a current error based on the current command and the actual current;
   fourth means, operatively connected to the servomotor, for amplifying the actual rotational velocity by a predetermined multiplying factor to produce a velocity compensation signal; and
   fifth means, operatively connected to said fourth means, said third means, and to the means for driving the servomotor, for combining the velocity compensation signal and the current error to generate a compensated amplitude command signal for actuating the means for driving the servomotor.

5. A servomotor control apparatus as set forth in claim 4, wherein said first means comprises:

means for detecting the actual rotational velocity of the servomotor;

means for generating a velocity error based on the difference between the velocity command signal and the actual rotational velocity of the servomotor; and means for generating the current command on the basis of the velocity error.

6. A servomotor control apparatus as set forth in claim 5, wherein said fourth means comprises a multiplier and wherein said fifth means comprises an adder circuit.

* * * * *

UNITED STATES PATENT AND TRADEMARK OFFICE
CERTIFICATE OF CORRECTION

PATENT NO.  : 4,477,762  
DATED       : OCTOBER 16, 1984  
INVENTOR(S) : MITSUO KURAKAKE ET AL.

Page 1 of 3

It is certified that error appears in the above-identified patent and that said Letters Patent is hereby corrected as shown below:

FRONT PAGE [73] Assignee, "Fujitsu Limited" should be --Fanuc Ltd--; and "Kawasaki" should be --Tokyo--.

Col. 1, line 27, "q" should be --$\underline{q}$--;  
line 33, "the a" should be --the $\underline{a}$--;  
line 38, "q" should be --$\underline{q}$--;  
line 40, "a" should be --$\underline{a}$--;  
line 47, "b and c" should be --$\underline{b}$ and $\underline{c}$--;  
line 48, "a" should be --$\underline{a}$--.

Col. 2, line 44, delete line in its entirety;  
line 46, delete line in ints entirety;  
line 67, "v" should be --$\underline{v}$--.

Col. 3, line 1, "v" should be --$\underline{v}$--;  
line 5, "i" should be --$\underline{i}$--;  
line 18, "v" should be --$\underline{i}$--;  
line 24, "v" should be --$\underline{v}$--;  
line 28, "v" should be --$\underline{v}$--;

UNITED STATES PATENT AND TRADEMARK OFFICE
CERTIFICATE OF CORRECTION

PATENT NO. : 4,477,762

DATED : OCTOBER 16, 1984

INVENTOR(S) : MITSUO KURAKAKE ET AL.

It is certified that error appears in the above-identified patent and that said Letters Patent is hereby corrected as shown below:

```
Col. 3, line 29,  "i" should be --i--; and
                  "t" should be --t--;
        line 31,  "i" should be --i--;
        line 32,  "v" should be --v--.

Col. 4, line 5,   delete "and" (first occurrence);
        line 14,  "v" should be --v--; and
                  "i" should be --i--;
        line 66,  "v" should be --v--.

Col. 5, line 39,  "sinα" should be --sin α--;
        line 40,  "cosα" should be --cos α--;
        line 51,  "cosα,sin" should be --cos α, sin α--;
        line 53,  "sinα" should be --sin α--; and
                  "cosα" should be --cos α--.

Col. 7, line 19,  "sinα, cosα" should be --sin α, cos α--;
        line 20,  "anglea" should be --angle α--.
```

UNITED STATES PATENT AND TRADEMARK OFFICE
CERTIFICATE OF CORRECTION

PATENT NO. : 4,477,762                                    Page 3 of 3
DATED      : OCTOBER 16, 1984
INVENTOR(S): MITSUO KURAKAKE ET AL.

It is certified that error appears in the above-identified patent and that said Letters Patent is hereby corrected as shown below:

Col. 8, line 56, "sinα" should be --sin α--; and
                 "cosineα" should be --cosine α--;
        line 60, "sinα and cosineα" should be --sin α and cosine α--;
        line 62, "sinα, cosineα" should be --sin α, cosine α--;
        line 64, "sinα and cosineα" should be --sin α and cosine α--.

*Signed and Sealed this*

*Twenty-seventh* Day of *August 1985*

[SEAL]

*Attest:*

DONALD J. QUIGG

*Attesting Officer*      *Acting Commissioner of Patents and Trademarks*